(12) United States Patent
Jan et al.

(10) Patent No.: US 11,289,772 B2
(45) Date of Patent: *Mar. 29, 2022

(54) BUS BARS FOR BATTERY PACKS

(71) Applicant: Atieva, Inc., Menlo Park, CA (US)

(72) Inventors: James Jan, Menlo Park, CA (US);
Richard J. Biskup, Menlo Park, CA (US); Benson Tsai, Menlo Park, CA (US)

(*) Notice: Subject to any disclaimer, the term of this patent is extended or adjusted under 35 U.S.C. 154(b) by 199 days.

This patent is subject to a terminal disclaimer.

(21) Appl. No.: 15/973,319

(22) Filed: May 7, 2018

(65) Prior Publication Data

US 2018/0261823 A1   Sep. 13, 2018

Related U.S. Application Data

(62) Division of application No. 13/794,535, filed on Mar. 11, 2013, now Pat. No. 9,966,584.

(51) Int. Cl.
*H01M 10/00* (2006.01)
*H01M 50/502* (2021.01)
(Continued)

(52) U.S. Cl.
CPC ......... *H01M 50/502* (2021.01); *H01M 10/04* (2013.01); *H01M 10/6567* (2015.04); *H01M 50/20* (2021.01); *H01M 10/0422* (2013.01); *H01M 10/123* (2013.01); *H01M 10/283* (2013.01); *H01M 10/613* (2015.04); *H01M 10/625* (2015.04); *H01M 10/643* (2015.04); *H01M 10/6551* (2015.04);
(Continued)

(58) Field of Classification Search
CPC .... H01M 2/206; H01M 2/202; H01M 2/1077; H01M 10/625; H01M 10/6551; H01M 10/643; H01M 10/6561; H01M 10/613; H01M 2220/20; H01M 50/502; H01M 10/04; H01M 10/6567; H01M 50/20; H01M 10/0422; H01M 10/123; H01M 10/283; H01M 50/213; Y10T 29/49108; Y02E 60/10; Y02P 70/50
See application file for complete search history.

(56) References Cited

U.S. PATENT DOCUMENTS 9,490,465 B2 * 11/2016 Jan ................. H01M 50/502
9,966,584 B2 * 5/2018 Jan ................... H01M 50/20
2012/0164490 A1 * 6/2012 Itoi ..................... H01M 2/105
429/7

FOREIGN PATENT DOCUMENTS

WO   WO-2011033713 A1 *  3/2011  .......... H01M 2/1077
WO   WO-2012068732 A1 *  5/2012  .......... H01M 10/659

* cited by examiner

*Primary Examiner* — Nicholas P D'Aniello
(74) *Attorney, Agent, or Firm* — The Brickell IP Group, PLLC; Javier Sobrado

(57) ABSTRACT

A battery pack has bus bars at one end, freeing the other end of the battery pack for cooling or other arrangements. A plurality of battery cells has first terminals of the battery cells at first ends of the battery cells. Portions of second terminals of the battery cells are at the first ends of the battery cells. The first ends of the battery cells are in a coplanar arrangement. A plurality of bus bars is assembled proximate to the first ends of the battery cells. The bus bars are coupled to the first terminals and the second terminals of the battery cells at the first ends of the battery cells to place the battery cells in one of a series connection, a parallel connection or a series and parallel connection.

7 Claims, 5 Drawing Sheets

(51) Int. Cl.
  *H01M 10/04* (2006.01)
  *H01M 50/20* (2021.01)
  *H01M 10/6567* (2014.01)
  *H01M 10/625* (2014.01)
  *H01M 10/6551* (2014.01)
  *H01M 10/643* (2014.01)
  *H01M 10/6561* (2014.01)
  *H01M 10/613* (2014.01)
  *H01M 10/12* (2006.01)
  *H01M 10/28* (2006.01)
  *H01M 50/213* (2021.01)
(52) U.S. Cl.
  CPC ...... *H01M 10/6561* (2015.04); *H01M 50/213* (2021.01); *H01M 2220/20* (2013.01); *Y10T 29/49108* (2015.01)

BUS BARS FOR BATTERY PACKS

BACKGROUND

A bus bar is a metal strip or bar that conducts electricity and is used for electrical power distribution. Battery cells can be connected with bus bars to make battery packs. Some battery packs using cylindrical cells make electrical connections to the tops and the bottoms of the cells. When connecting cells in series, bus bars and high current interconnects link the positive terminal of one cell, or a parallel group of cells, to the negative terminal of the next cell or the next parallel group of cells. However, connections to the bottoms of the cells obstruct airflow or liquid flow from cooling mechanisms utilized to remove heat generated by the cells. In addition, the high current interconnect from the bottoms of the cells to the bus bars, which may be in the form of a wire somewhat longer than the length of a cell, introduces a small amount of resistance which gives rise to a voltage drop at high current levels. Assembly of this wire to the bus bars or to the bottom of the battery adds costs to a battery pack and may introduce reliability issues.

It is within this context that the embodiments arise.

SUMMARY

One embodiment of a battery pack has a plurality of battery cells and a plurality of bus bars. The battery cells have first terminals of the battery cells at first ends of the battery cells. The battery cells have portions of second terminals of the battery cells at the first ends of the battery cells. The first ends of the battery cells are in a coplanar arrangement. The plurality of bus bars is disposed proximate to the first ends of the battery cells. The plurality of bus bars is coupled to the first terminals and the portions of the second terminals of the battery cells at the first ends of the battery cells to place the battery cells in one of a series connection, a parallel connection or a series and parallel connection.

Another embodiment of a battery pack has a cell holder, a plurality of bus bars and a plurality of battery cells. The plurality of bus bars is positioned at a first end of the cell holder. The plurality of battery cells is arranged in the cell holder. Each of the battery cells has a first terminal proximate to the plurality of bus bars. Each of the battery cells has a portion of a second terminal proximate to the plurality of bus bars. The first terminal and the portion of the second terminal are electrically coupled to the plurality of bus bars at a first end of the battery cell. The battery cells are in one of a parallel connection, a series connection, or a parallel and series connection.

A method of assembling a battery pack is provided. The method includes arranging a plurality of battery cells so that first ends of the battery cells are coplanar. Each of the battery cells has a first terminal of a first polarity at the first end of the battery cell and a portion of a second terminal of a second polarity at the first end of the battery cell. The method includes arranging a plurality of bus bars proximate to the coplanar first ends of the battery cells. Coupling the plurality of bus bars to the first terminals and the second terminals of the battery cells is included in the method. The coupling is at the first ends of the battery cells thereby leaving the opposing end available for heat removal. The battery cells may be coupled in one of a series connection, a parallel connection, or a series and parallel connection.

Other aspects and advantages of the embodiments will become apparent from the following detailed description taken in conjunction with the accompanying drawings which illustrate, by way of example, the principles of the described embodiments.

BRIEF DESCRIPTION OF THE DRAWINGS

The described embodiments and the advantages thereof may best be understood by reference to the following description taken in conjunction with the accompanying drawings. These drawings in no way limit any changes in form and detail that may be made to the described embodiments by one skilled in the art without departing from the spirit and scope of the described embodiments.

DETAILED DESCRIPTION

Figure 1:
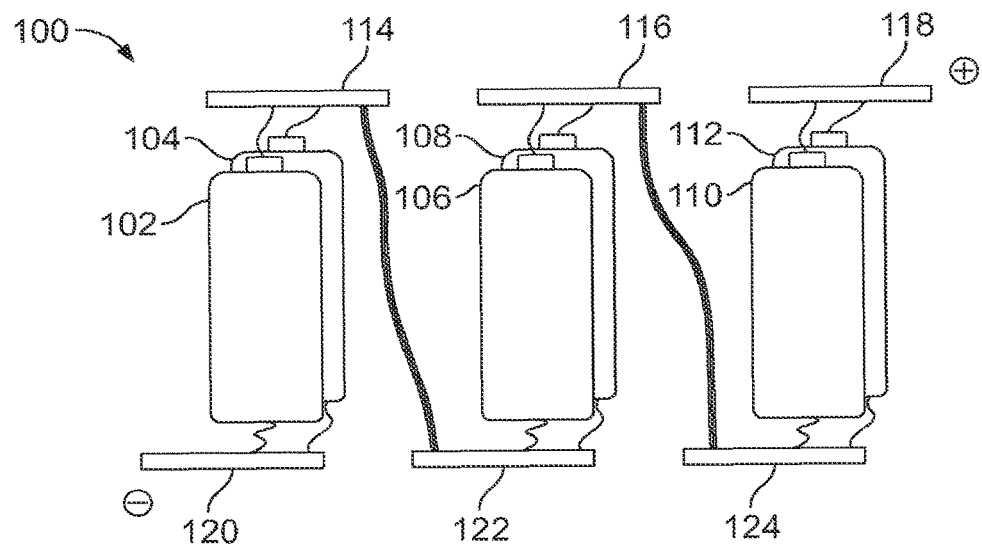
FIG. 1 is a schematic diagram of a battery pack with bus bars above and below the battery cells.

Detailed illustrative embodiments of a battery pack where the bus bars are located proximate to one end of the battery terminals to leave the opposing end accessible to a heat sink are provided herein. However, specific functional details disclosed herein are merely representative for purposes of describing embodiments. Embodiments may, however, be embodied in many alternate forms and should not be construed as limited to only the embodiments set forth herein.

It should be understood that although the terms first, second, etc. may be used herein to describe various steps or calculations, these steps or calculations should not be limited by these terms. These terms are only used to distinguish one step or calculation from another. For example, a first calculation could be termed a second calculation, and, similarly, a second step could be termed a first step, without departing from the scope of this disclosure. As used herein, the term "and/or" and the "/" symbol includes any and all combinations of one or more of the associated listed items.

As used herein, the singular forms "a", "an" and "the" are intended to include the plural forms as well, unless the context clearly indicates otherwise. It will be further understood that the terms "comprises", "comprising", "includes", and/or "including", when used herein, specify the presence of stated features, integers, steps, operations, elements, and/or components, but do not preclude the presence or addition of one or more other features, integers, steps, operations, elements, components, and/or groups thereof.

Therefore, the terminology used herein is for the purpose of describing particular embodiments only and is not intended to be limiting.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

One type of battery pack, as shown in schematic form in FIG. 1, uses bus bars above and below the battery cells to connect the battery cells in a parallel, series or series-parallel manner, which limits the ability to remove heat generated by the cells of the battery pack. By contrast, embodiments of the battery pack of FIGS. 2A and 4-7 have bus bars only at one end of the battery cells or the cell holder, in various arrangements as will be further discussed below. The battery packs described herein may be used with lithium-ion battery cells or other types of rechargeable battery cells, and may be used in electric vehicles, hybrid vehicles and other applications. Electric vehicles and hybrid vehicles include land based motor vehicles as well as air based vehicles, such as airplanes, helicopters, rockets, spaceships, etc., and water based vehicles, such as boats, submarines, etc. It should be appreciated that the embodiments may also be integrated with non-rechargeable battery cells.

FIG. 1 shows a battery pack 100 with a first group of battery cells 102, 104 in a parallel connection, a second group of battery cells 106, 108 in a parallel connection, and a third group of battery cells 110, 112 in a parallel connection. The first group, the second group and the third group are coupled in a series connection. Bus bars 114, 116, 118, 120, 122, 124 are used to connect the battery cells in this parallel and series coupling. Each of the bus bars is coupled to the respective battery cells with one or more wires. A relatively thick wire couples the second bus bar 114 to the third bus bar 122, making a series connection for the first group and the second group of battery cells. Another relatively thick wire couples the fourth bus bar 116 to the fifth bus bar 124, making a series connection for the second group and the third group of battery cells, so that the sixth bus bar is the positive terminal for the battery pack 100.

Figure 2A:
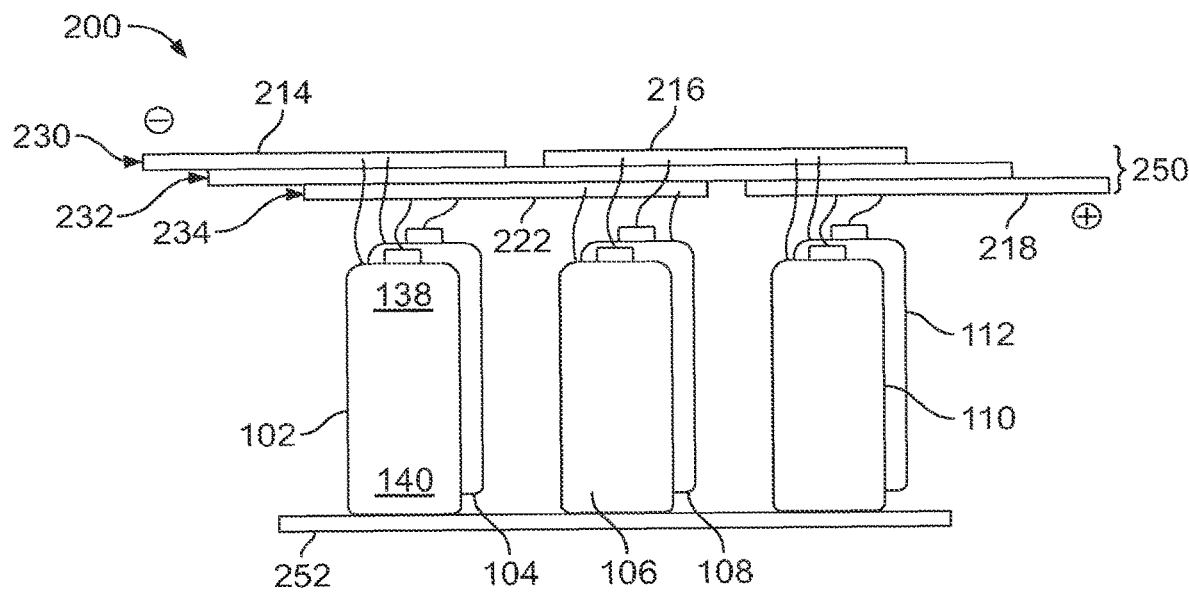
FIG. 2A is a schematic diagram of a battery pack with bus bars adjacent to the positive terminals of the battery cells, in accordance with one embodiment.

FIG. 2A shows a battery pack 200 with a bus bar arrangement enabling efficient heat removal from one end of the battery pack as all the bus bars are proximate to the other end of the battery pack. In this embodiment, the bus bars 214, 216, 222, 218 are assembled proximate to one end of the battery cells, enabling the use of fewer bus bars than in the battery pack of FIG. 1. The relatively thick wires from upper bus bars to lower bus bars are eliminated in the embodiment of FIG. 2A. The battery pack 200 makes use of the access to both positive and negative terminals at one end of the cells, e.g., a top end of the cells, by coupling the bus bars to the positive and negative terminals through wires proximate to the top end of the cells. It should be appreciated that the embodiment of FIG. 2A enables the use of wires that are shorter in length than any of the battery cells. As shown in FIG. 2A, the first group of battery cells 102, 104 is in a parallel connection, the second group of battery cells 106, 108 is in a parallel connection, and the third group of battery cells 110, 112 is in a parallel connection. The first group, the second group and the third group are in a series connection with each other. Bus bars 214, 216, 218, 222 are used to couple the battery cells in this parallel and series coupling, as follows. Starting with the negative terminal of the battery pack 200, a first bus bar 214 is connected to the negative terminals of the first group of battery cells 102, 104 at a top end 138 of each of the battery cells. The second bus bar 222 is connected to the positive terminals of the first group of battery cells 102, 104 at the top end 138 of each of the battery cells. The first and second bus bars 214, 222 couple the first group of battery cells 102, 104 in parallel. The second bus bar 222 and the third bus bar 216 couple the second group of battery cells 106, 108 in parallel. The third bus bar 216 and the fourth bus bar 218 couple the third group of battery cells 110, 112 in parallel. Series connections are formed by the bus bars. The second bus bar 222 connects the positive terminals of the first group of battery cells 102, 104 to the negative terminals of the second group of battery cells 106, 108. The third bus bar 216 connects the positive terminals of the second group of battery cells 106, 108 to the negative terminals of the third group of battery cells 110, 112. The fourth bus bar 218 is the positive terminal of the battery pack 200. Other arrangements of bus bars and parallel connections, serial connections, or parallel and series connections are readily devised as variations. Battery cells of other polarities may be used in these variations. It should be appreciate that the connections between the battery cells and the bus bars may be made through wires extending through apertures defined through the layer stack as described below with reference to FIG. 2B.

The bus bars can be arranged in a layer stack 250, or in other arrangements as will be later discussed. In the layer stack 250, the first bus bar 214 and the third bus bar 216 are placed in a first layer 230, and are separated by a gap so as not to short-circuit. The gap may be filled with an insulator in some embodiments, however this is optional. An insulator is disposed as the second layer 232. The second bus bar 222 and the fourth bus bar 218 are placed in a third layer 234, and are separated by a gap or insulator so as not to short-circuit. The third layer 234 is separated from the first layer 230 by the second layer 232, namely the insulator, so that the bus bars on differing layers do not short-circuit. It should be appreciated that alternate configurations of the layer stack are possible as FIG. 2A is one example and not meant to be limiting. For example, the layer stack may have more than three layers and each bus bar layer may have a single bus bar or two or more bus bars disposed within a single co-planar layer.

Battery cells 102-112 have a projecting nub as a positive terminal at the top end of the cell. Battery cells 102-112 have a can or casing as a negative terminal of the cell. The casing has a relatively flat surface at the bottom end of the cell, cylindrical sides, and a portion of the negative terminal at the top end of the cell. In some types of battery cells, the casing has a crimp at the top end of the cell, which is formed as the casing is sealed around the contents of the battery cell. This crimp or other portion of the negative terminal at the top end of the cell provides physical and electrical access at the top end to the negative terminal of the battery cell. The crimp is spaced apart from the peripheral sides of the projecting nub through a gap that may or may not be filled with an insulator.

It should be appreciated that having bus bars at both ends, i.e., the top and the bottom, of the battery cells does not leave an area where a heat sink can be affixed to be in thermal communication with the top or bottom surfaces of the battery cells for efficient heat removal. In addition soldering or otherwise connecting the relatively thick wire from an upper bus bar to a lower bus bar involves an assembly operation which adds to costs of the production of battery packs. This relatively thick wire is longer than the length of any one of the battery cells and can introduce parasitic resistance into the current path, which in turn can introduce a voltage drop under high current drain conditions. The relatively thick wire can also be subject to breakage and contact to one or more of the cells and attendant short-circuit, open circuit or other reliability problems.

In one embodiment, the layer stack is formed using layers of a circuit board. For example, the bus bars can be made of (or on) copper layers or another suitable conductive metal and the insulator can be made of resin impregnated fiberglass or other suitable insulator materials. In variations, the bus bars can be made of aluminum or other metals, and various materials may be applied as an insulator. In one embodiment, a heat sink 252 is assembled to the bottom ends 140 of the battery cells 102, 104, 106, 108, 110, 112 and is thermally coupled to the bottom ends 140. The heat sink may have finning or passages for air or liquid cooling. A fan may supply air flow across a surface of the heat sink 252 in some embodiments. In a variation, the heat sink is attached or affixed to the bottom of a battery cell holder, such as the battery cell holder of FIG. 3. The co-planar arrangement of the battery cells provides a relatively flat surface to attach a heat sink and in some embodiments the battery cells are designed to cool efficiently through the bottom of the cells, e.g., 18650 Lithium ion batteries.

Figure 2B:
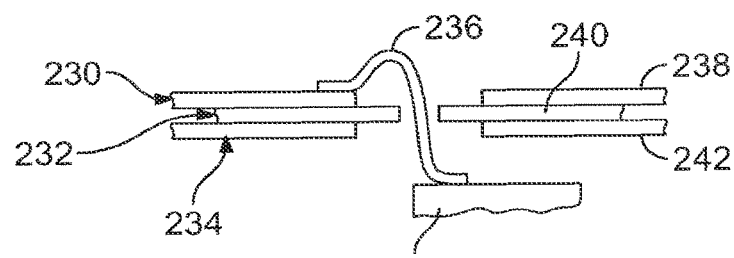
FIG. 2B is a cross-section view of bus bars in a layer stack, in an embodiment of the battery pack of FIG. 2A.

One way of routing wires connecting the bus bars to the battery cell terminals is shown in FIG. 2B. These wires, as shown in FIGS. 2A and 2B, can be shorter than the length of a battery cell, and are thus shorter than and less resistive than wires connecting from overhead bus bars to the bottoms of the battery cells as shown in FIG. 1. In FIG. 2B, each of the materials in the layer stack has an aperture, and the sizes of the apertures are arranged so that a bond wire 236 or other wire is less likely to short out to one of the bus bars. In the example shown, a bus bar on the first layer 230 of the layer stack has an aperture 238, through which the bond wire 236 can pass. An insulator on the second layer 232 of the layer stack has a smaller aperture 240, through which the bond wire 236 can pass. A bus bar on the third layer 234 of the layer stack has a larger aperture 242, through which the bond wire 236 can pass. The smaller aperture 240 of the insulator, i.e., the second layer 232, constrains motion of the bond wire 236 so that the bond wire 236 is less likely to contact edges of the larger aperture 242 or aperture 238. In other words, the bond wire 236 is less likely to contact the bus bar on the third layer 234 or the first layer as a result of the staggered sizes of the apertures. Bond wire 236 couples the bus bar on the first layer 230 to a surface 134 of a battery cell, e.g., a positive nub terminal or a negative terminal at the top of the battery cell. The apertures of the lower bus bar, closer to the first ends of the battery cells, are larger than the apertures of the insulator. In some embodiments the apertures are circular and the diameter of aperture 240 is less than the diameter of the apertures through the bus bars above and below the insulator layer. In addition, it should be appreciated that the apertures of one layer are aligned with apertures of another layer so that access is provided through the layer stack. It should be further appreciated that the apertures may be any geometric configuration and are not limited to circular shapes. Other arrangements of apertures are readily devised, for example to accommodate wires bonded or attached to another surface of a bus bar or attached in another manner. The embodiments of the stacked bus bars may be encased within a housing for use in a particular application, such as a hybrid or electric vehicle.

Figure 3:
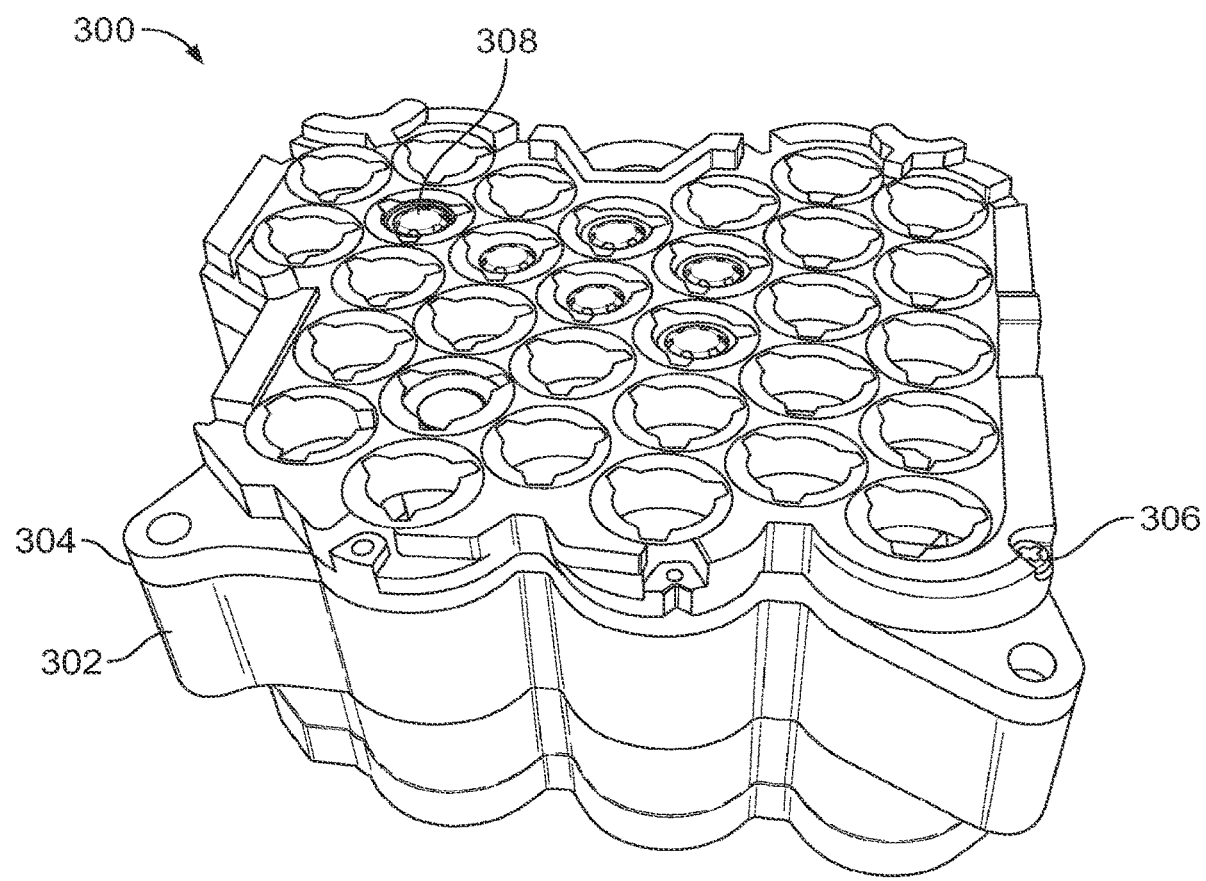
FIG. 3 is a perspective view of a cell holder in accordance with one embodiment.

FIG. 3 shows a battery cell holder 300. In the embodiment shown, the battery cell holder 300 is made of a plastic material. Variations of the battery cell holder 300 may be made of other materials, and may be molded, cast or even produced using a 3-D printer. Battery cells 308 are inserted into a housing 302, and a lid 304 is attached to the housing 302, for example by one or more fasteners 306 or other means. The battery cell holder 300 retains the battery cells in a close-pack or dense-pack, staggered row or hexagonal arrangement. Other arrangements are readily devised as the embodiments are not limited to the hexagonal arrangement. As shown, the battery cell holder 300 is only partially populated, and can readily be filled with battery cells. These can be commercially available battery cells, such as lithium ion cells or cells of another chargeable or non-chargeable technology. In other embodiments, the battery cells may be proprietary battery cells made especially for a specific battery pack. The battery cell holder 300 is shown without the bus bars, which are readily added as shown in FIGS. 4-6.

Figure 4:
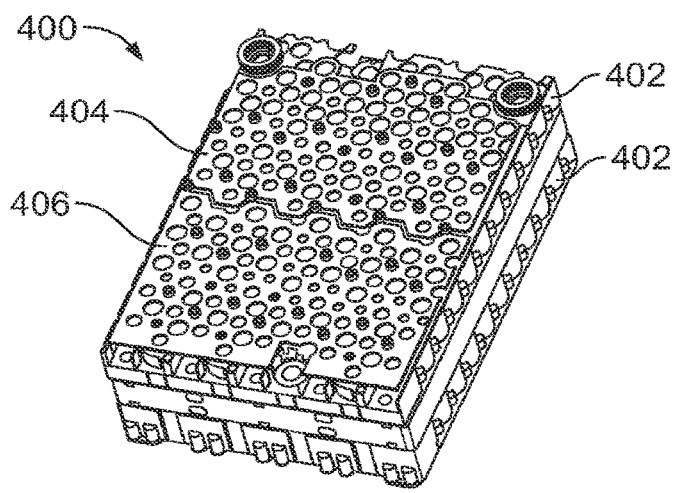
FIG. 4 is a perspective view of a battery pack with a bus bar layer at one end of the battery pack, in accordance with one embodiment.

FIG. 4 shows a battery pack 400, such as the battery cell holder FIG. 3 or a variation thereof fully populated with battery cells. At one end of the housing 402, for example the top end of the housing 402, a bus bar layer is added. The bus bar layer has a first bus bar 404 and a second bus bar 406. The first bus bar 404 couples a first group of battery cells to a second group of battery cells in series, and the second bus bar 406 connects a third group of battery cells to a fourth group of battery cells in series. A gap separates the first bus bar 404 and the second bus bar 406 (similarly to the arrangement shown in FIG. 2A) so that these bus bars do not short. The first bus bar 404 and the second bus bar 406 extend over an entirety of the top surface of the housing 402 in this embodiment. The first bus bar 404 and the second bus bar 406 have apertures through which bond wires or other wires can pass to form electrical connections with the battery cells and corresponding bus bar.

Figure 5:
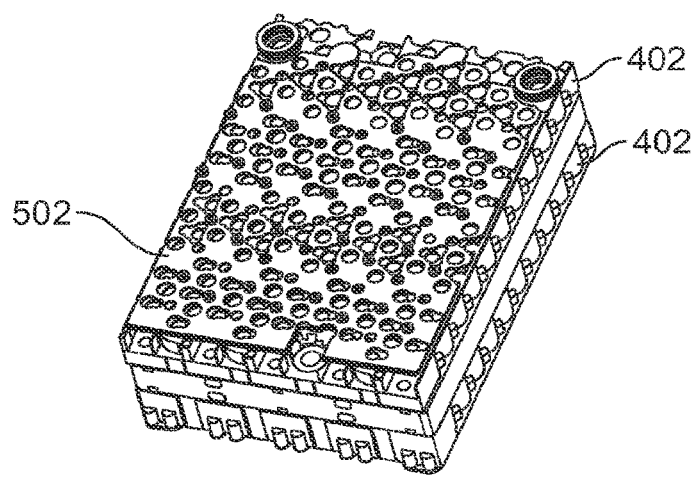
FIG. 5 is a perspective view of the battery pack of FIG. 4 with an insulator layer on top of the bus bar layer.

FIG. 5 shows the battery pack 400, with an insulator layer 502 added on top of the bus bar layer. The insulator layer 502 covers the top surface of first bus bar 404 and the second bus bar 406 of FIG. 4, and may have apertures through which bond wires or other wires can pass to form electrical connections with the battery cells. As illustrated, the apertures of the insulator layer 502 are aligned with corresponding apertures of the bus bar layer of FIG. 4. FIG. 6 shows the battery pack 400, with a bus bar layer on top of the insulator layer 502 of FIG. 5. In FIG. 6, the added bus bar layer includes a third bus bar 602, a fourth bus bar 604, and a fifth bus bar 606. The third bus bar 602 connects the first group of battery cells to another block or group of battery cells, e.g., in a neighboring battery pack. The fourth bus bar 604 connects the second group of battery cells to the third group of battery cells. The fifth bus bar 606 connects the fourth group of battery cells to another block or group of battery cells, e.g., in a second neighboring battery pack. Bus bars 602-604 include apertures defined through the surface and these apertures are aligned with the apertures of the insulator layer of FIG. 5 and the apertures of the first bus bar layer of FIG. 6. Thus with the corresponding apertures of each layer substantially aligned, access is provided for wires or leads from the battery cells to each bus bar layer as illustrated with reference to FIG. 2B.

Figure 6:
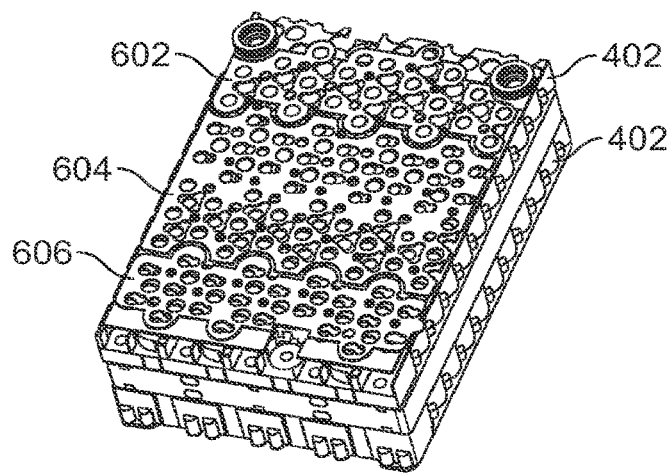
FIG. 6 is a perspective view of the battery pack of FIG. 5 with another bus bar layer on top of the insulator layer.

Referring to FIGS. 4-6, the first group of battery cells is thus connected in parallel by the first bus bar 404 and the third bus bar 602. The second group of battery cells is connected in parallel by the first bus bar 404 and the fourth bus bar 604. The third group of battery cells is connected in parallel by the fourth bus bar 604 and the second bus bar 406. The fourth group of battery cells is connected in parallel by the fifth bus bar 606 and the second bus bar 406. Other groupings of parallel and series connections can be formed by other arrangements and connections of bus bars as readily devised in variations. In addition, more stacks of bus bars and insulator layer may be integrated into the embodiments discussed herein.

Figure 7:
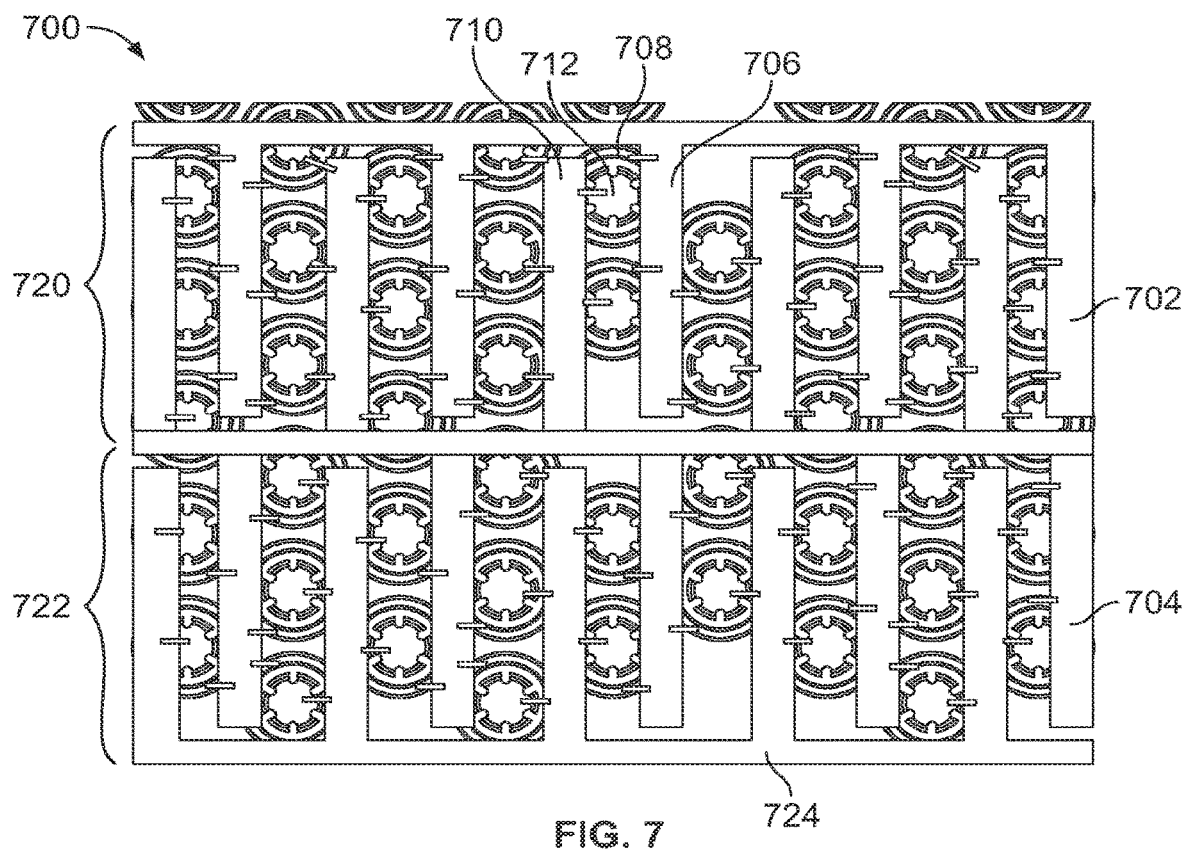
FIG. 7 illustrates bus bars with interleaved fingers in accordance with one embodiment.

FIG. 7 shows an alternative technique for arranging bus bars at a single end of a battery pack, i.e., at one end of each of the battery cells. Two bus bars 702, 704 are in coplanar arrangement, and have interleaved fingers 706, 710, in an interleaved bus bar arrangement 700. That is, the fingers 706 of a first bus bar 702 are interleaved and co-planar with the fingers 710 of a second bus bar 704. The fingers 706 of the first bus bar are coupled to the negative terminals 708 of a first group 720 of the battery cells. The fingers 710 of the second bus bar 704 are coupled to the positive terminals 712 of the first group 720 of the battery cells. In this example, the coupling from the bus bars to the positive and negative terminals of the battery cells is via bond wires attached at the top ends of the battery cells. The first bus bar 702 and the second bus bar 704 connect the first group 720 of the battery cells in parallel. Additional fingers of the second bus bar 704 are connected to the negative terminals of a second group 722 of battery cells. Fingers of a third bus bar 724 are connected to the positive terminals of the second group 722 of battery cells. The second bus bar 704 and the third bus bar 724 connect the second group 722 of the battery cells in parallel. Thus, the second bus bar 704 connects the first group 720 and the second group 722 of battery cells in series. Additional groups of battery cells can be connected in series by additional bus bars with interleaved fingers, in related arrangements.

Figure 8:
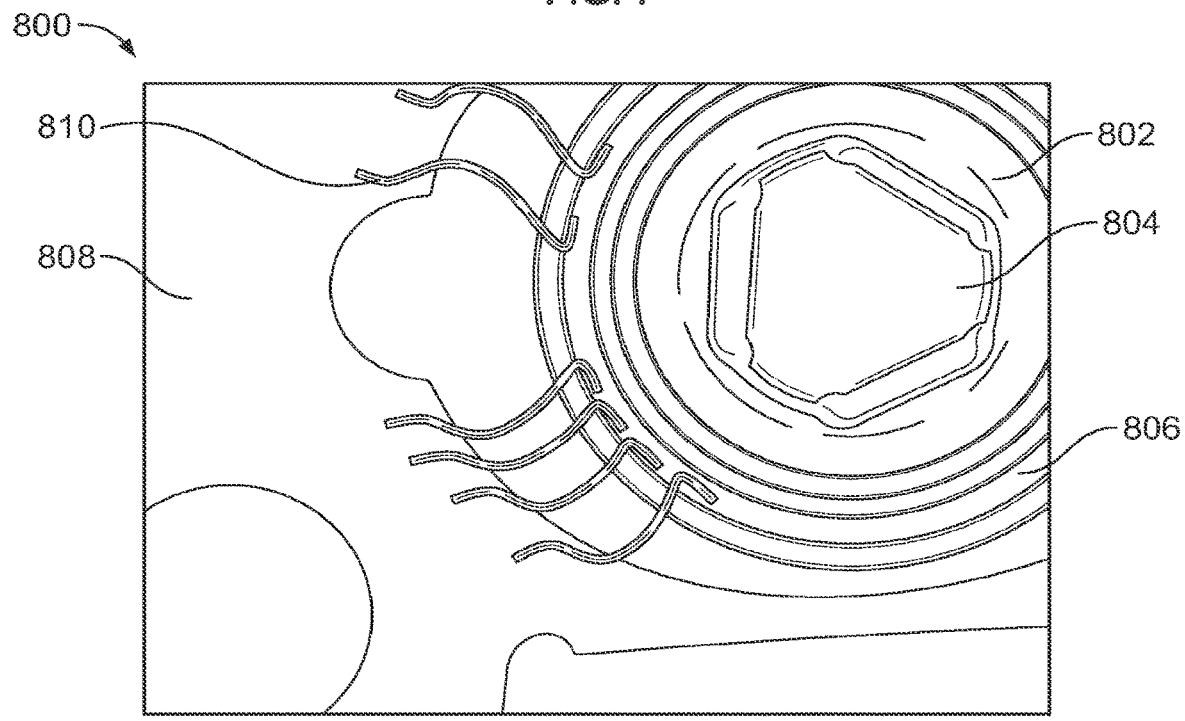
FIG. 8 is a perspective view of bond wires coupling a bus bar to a terminal of a battery cell at one end of the battery cell in accordance with one embodiment.

FIG. 8 shows bond wires 810 coupling or electrically connecting a bus bar 808 to the negative terminal 806 of a battery cell 802, in a bus to cell wiring arrangement 800. The battery cell 802 has a nub 804 as a positive terminal, which will be later connected to another one of the bus bars. The bond wires 810 are, in one example, ultrasonically welded to the bus bar 808 at a proximate end of the bond wire, and ultrasonically welded to the negative terminal 806 of the battery cell at distal end of the bond wire. The bond wires may be aluminum, copper, silver or other conductive metals or combinations thereof. Other types of electrical connections between bus bars and battery terminals may be devised, such as spot welding, soldering, spring contacts, etc. It should be appreciated that the positive and negative electrical connections can be made utilizing the same machine or tool in these embodiments to further enhance manufacturing efficiencies.

Figure 9:
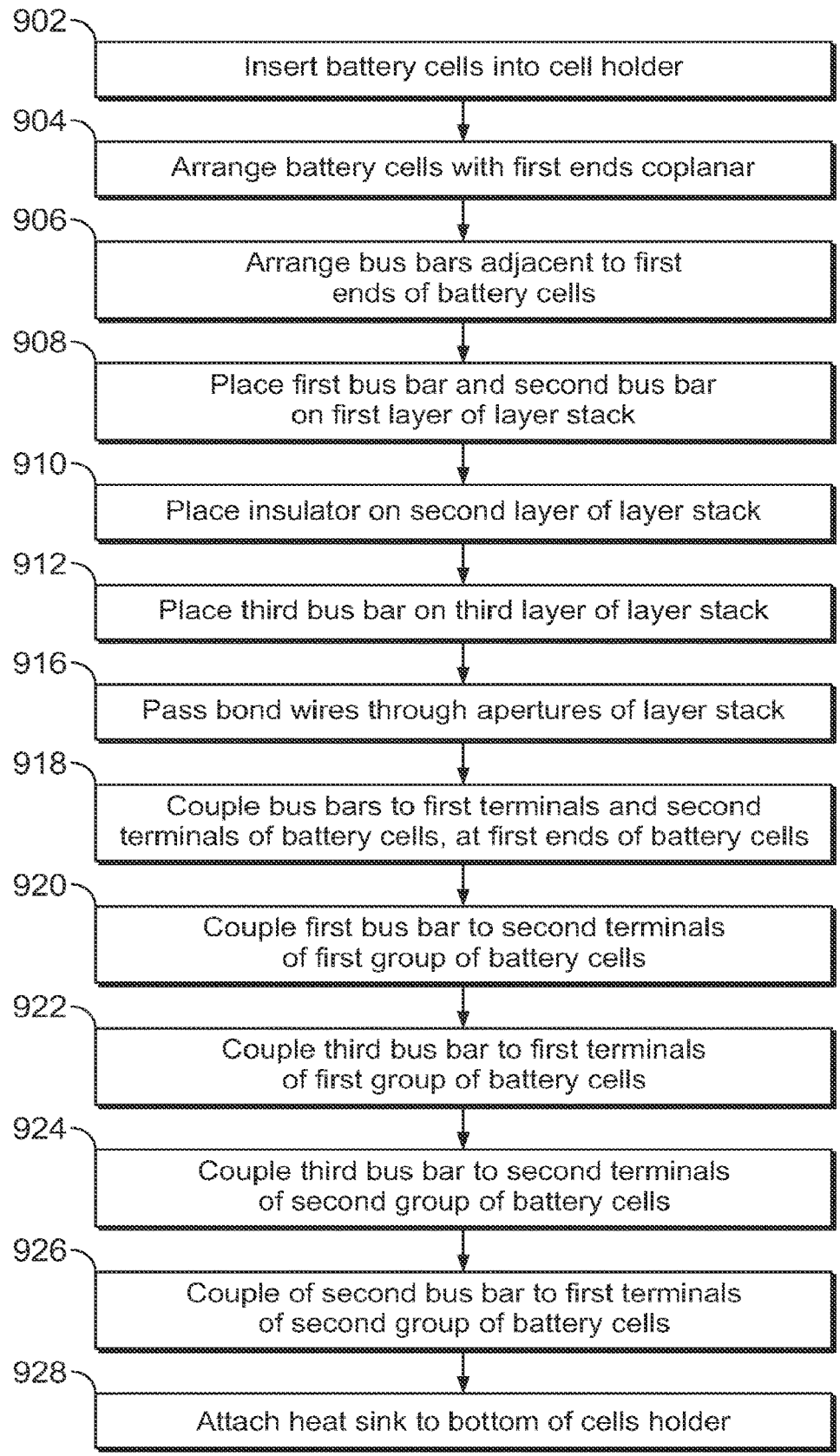
FIG. 9 is a flow diagram of a method for making a battery pack having the bus bars at a single end of the battery cells in accordance with one embodiment.

FIG. 9 shows a flow diagram of a method 900 for assembling a battery pack. Variations of the method 900 are readily devised, using fewer operations, additional operations, changing the order of the operations and so on. In an operation 902, battery cells are inserted into a cell holder or some suitable support structure for the battery cells. For example, the cell holder 300 and battery cells shown in FIG. 3 may be used. The battery cells are arranged with the first ends coplanar, in an operation 904. Bus bars are arranged proximate to the first ends of the battery cells, in operation 906. The bus bars are arranged over one end of the battery cells in a stacked arrangement in order for efficient heat removal from the opposing end. In operation 908, in one embodiment, a first bus bar and a second bus bar are placed on a first layer of a layer stack. An insulator is placed as the second layer over the first layer of the layer stack, in an operation 910. A third bus bar is placed on a third layer of the layer stack, in an operation 912. For example, the layer stack shown in FIGS. 2A and 2B may be used with apertures as shown in FIG. 2B. Thus, all the bus bars are assembled along a single plane along the top of the cells to free up the area at the bottom of the cells for thermal management. In addition, both the positive and negative electrical connection discussed below can be made from a single end of the assembly thereby enabling completion of the high current connections without having to reposition the In one embodiment, bond wires are passed through apertures of the layer stack, in an operation 916. The bus bars are coupled to the first terminals and the second terminals of the battery cells, at first ends of the battery cells, in an operation 918. For example, in operation 920, the first bus bar is coupled to the second terminals of a first group of battery cells. In operation 922, the third bus bar is coupled to the first terminals of the first group of battery cells. In operation 924, the third bus bar is coupled to the second terminals of a second group of battery cells. The second bus bar is coupled to the first terminals of the second group of battery cells, in an operation 926. The operations 920, 922, 924, 926 of coupling the first, second and third bus bars to the terminals of the first and second groups of battery cells results in a parallel-connected first group of battery cells and a parallel-connected second group of battery cells, with the first and second groups in series connection. Other arrangements of battery cells are provided by variations of the method 900. In an operation 928, in one embodiment, a heat sink is attached to the bottom of the cell holder. The heat sink may have air flow or liquid flow directed over a surface of the heat sink by a further cooling mechanism, e.g., a fan or a liquid pump. Duct work or plumbing for the airflow or the liquid flow, mounting of a fan or a liquid pump, and electrical wiring for the fan or the liquid pump are readily devised.

With the above embodiments in mind, it should be understood that the embodiments might employ various computer-implemented operations involving data stored in computer systems. These operations are those requiring physical manipulation of physical quantities. Usually, though not necessarily, these quantities take the form of electrical or magnetic signals capable of being stored, transferred, combined, compared, and otherwise manipulated. Further, the manipulations performed are often referred to in terms, such as producing, identifying, determining, or comparing. Any of the operations described herein that form part of the embodiments are useful machine operations. The embodiments also relate to a device or an apparatus for performing these operations. The apparatus can be specially constructed for the required purpose, or the apparatus can be a general-purpose computer selectively activated or configured by a computer program stored in the computer. In particular, various general-purpose machines can be used with computer programs written in accordance with the teachings herein, or it may be more convenient to construct a more specialized apparatus to perform the required operations.

Although the method operations were described in a specific order, it should be understood that other operations may be performed in between described operations, described operations may be adjusted so that they occur at slightly different times or the described operations may be distributed in a system which allows the occurrence of the processing operations at various intervals associated with the processing.

The foregoing description, for the purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the embodiments and its practical applications, to thereby enable others skilled in the art to best utilize the embodiments and various modifications as may be suited to the particular use contemplated. Accordingly, the present embodiments are to be considered as illustrative and not restrictive, and the invention is not to be limited to the details given herein, but may be modified within the scope and equivalents of the appended claims.

What is claimed is:

1. A battery pack comprising:
   a cell holder;
   a plurality of bus bars positioned at a first end of the cell holder; and
   a plurality of battery cells arranged in the cell holder with each of the plurality of battery cells having a first terminal proximate to the plurality of bus bars and a portion of a second terminal proximate to the plurality of bus bars, the first terminal and the portion of the second terminal electrically coupled to the plurality of bus bars at a first end of the battery cell such that the plurality of battery cells is in one of a parallel connection, a series connection or a parallel and series connection;
   the plurality of bus bars comprising:
   a first planar bus bar directly electrically coupled to a first one of the first terminals by a first wire;
   a second planar bus bar separated from and coplanar with the first planar bus bar, the second planar bus bar directly electrically coupled to a first one of the second terminals by a second wire and to a second one of the first terminals by a third wire; and
   a third bus bar directly electrically coupled to a second one of the second terminals by a fourth wire, the third bus bar disposed over an insulator layer, the insulator layer disposed over the first planar bus bar and the second planar bus bar, wherein the third bus bar is coupled to the second one of the second terminals by the fourth wire extending through aligned apertures of the first planar bus bar, the insulator layer and the third bus bar.

2. The battery pack of claim 1 wherein the plurality of bus bars includes the first planar bus bar, the insulator layer and the third bus bar, in a stacked parallel arrangement.

3. The battery pack of claim 2, wherein the aperture of the first planar bus bar and the aperture of the third bus bar are larger than the aperture of the insulator layer.

4. The battery pack of claim 1, wherein each wire electrically coupling the plurality of bus bars to the first terminals or the portion of the second terminals of the battery cells has a length less than a length of each battery cell.

5. The battery pack of claim 1, wherein the battery pack is integrated into a rechargeable vehicle.

6. The battery pack of claim 1, further comprising a heat sink attached to an opposed second end of the cell holder.

7. The battery pack of claim 1, wherein the plurality of battery cells includes a first group of battery cells that are coupled in parallel, and includes a second group of battery cells that are coupled in parallel, which is in series with the first group.

* * * * *